(12) United States Patent
Smith et al.

(10) Patent No.: US 6,586,911 B1
(45) Date of Patent: Jul. 1, 2003

(54) SLEEP MODE POWER MANAGEMENT

(75) Inventors: Gregory J. Smith, Tucson, AZ (US); William D. MacLean, Oro Valley, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/068,536

(22) Filed: Feb. 6, 2002

(51) Int. Cl.$^7$ .............................................. H01M 10/46
(52) U.S. Cl. ....................................... 320/134; 320/136
(58) Field of Search ................................ 320/125, 128, 320/134, 136, 152, 157, 162, 164, 138; 361/78, 79, 92, 93.1

(56) References Cited

U.S. PATENT DOCUMENTS

| | | | |
|---|---|---|---|
| 5,471,128 A | 11/1995 | Patino et al. | 320/13 |
| 5,767,659 A | 6/1998 | Farley | 320/106 |
| 5,982,149 A | 11/1999 | Shih | 320/134 |
| 6,130,813 A | * 10/2000 | Kates et al. | |

OTHER PUBLICATIONS

*Lithium–Ion Linear Battery Charger Controller*, Linear Technology Corporation, 2000, 12 pgs.

* cited by examiner

*Primary Examiner*—Edward H. Tso
(74) *Attorney, Agent, or Firm*—Brett A. Hertzberg; Merchant & Gould

(57) ABSTRACT

A power management circuit for a battery operated electrical device that may include a number of switching circuits. The switching circuits are coupled between the battery and a corresponding one of various electronic sub-circuits. A battery monitoring circuit is arranged to monitor a voltage associated with the battery. Each switching circuit selectively couples a corresponding one of the electronic sub-circuits to the battery based on the battery voltage. In another example, the monitor circuit and the switching circuit functions are provided within the corresponding electronic sub-circuit. Battery power is conserved by selectively disabling (i.e., placing them in a sleep mode) the various electronic sub-circuits based on the battery voltage. The power management circuit may be arranged to select between charger circuits that have distinct charging characteristics, as well as to enable/disable various analog and digital electronics in the battery operated electrical device depending upon the monitored battery condition.

21 Claims, 4 Drawing Sheets

SLEEP MODE POWER MANAGEMENT

FIELD OF THE INVENTION

The present invention is related generally to power management in a battery powered electronic system. More specifically, the present invention is related to a power management system that is employed by a portable electronic system by selectively placing various electronic sub-circuits within the portable electronic system into a sleep mode based on the battery voltage.

BACKGROUND OF THE INVENTION

Many portable electrical devices utilize a rechargeable battery to provide power to the electrical devices. These devices include computers, cellular telephones, pagers, radios, power tools, and the like. For improved service life and extended time between charges, these batteries and devices often include a control circuit (commonly called a power controller, a battery control circuit, a charge controller, and the like) to control the charging and/or the discharging of the battery. The control circuit controls the battery charge by a charger circuit, and controls the discharge of the battery by deactivating control circuit units to prevent drainage of the battery unit.

A battery charge circuit having a given charge characteristic may be most appropriate for charging a battery based on various criteria such as battery type, and charge storage capacity. For example, Lithium-Ion batteries and Lithium-Polymer batteries are often used in portable applications such as cellular telephones. Lithium batteries are sensitive to excessive voltages, which may result in damage to the battery and/or a possibly explosive condition. The battery charger and controller design for a Lithium-Ion battery should include a suitable safety circuit (i.e., a shunt regulator) to prevent overcharging the battery.

SUMMARY OF THE INVENTION

The present invention is directed at a power management circuit for a battery operated electrical device that may include a number of switching circuits. The switching circuits are coupled between the battery and a corresponding one of various electronic sub-circuits. A battery monitoring circuit is arranged to monitor a voltage associated with the battery. Each switching circuit selectively couples a corresponding one of the electronic sub-circuits to the battery based on the battery voltage. In another example, the monitor circuit and the switching circuit functions are provided within the corresponding electronic sub-circuit. Battery power is conserved by selectively disabling (i.e., placing them in a sleep mode) the various electronic sub-circuits based on the battery voltage. The power management circuit may be arranged to select between charger circuits that have distinct charging characteristics, as well as to enable/disable various analog and digital electronics in the battery operated electrical device depending upon the monitored battery condition.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE INVENTION

Figure 1:
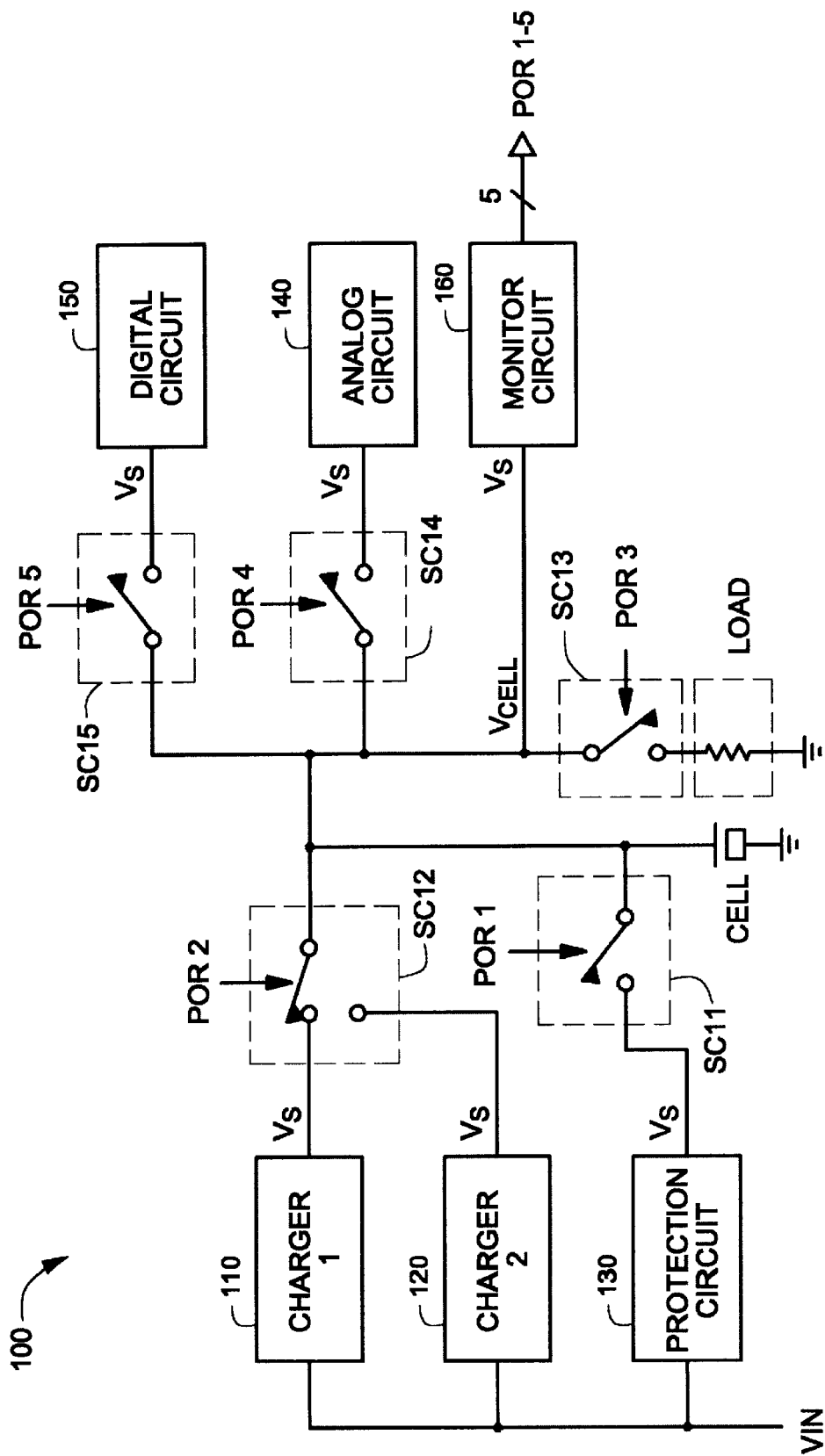
FIG. 1 is a schematic diagram of an exemplary control circuit.

Before exemplary embodiments of the present invention are explained in detail, it is to be understood that the invention is not limited in its application to the details of construction and the arrangements of components set forth in the following description or illustrated in the drawings. The present invention is capable of other embodiments and of being practiced or being carried out in various ways. These embodiments are described in sufficient detail to enable those skilled in the art to practice the invention, and it is to be understood that other embodiments may be utilized, and other changes may be made, without departing from the present invention. Also, it is to be understood that the phraseology and terminology used herein is for the purpose of description and should not be regarded as limiting.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

FIG. 1 is a schematic diagram of an exemplary battery-powered system (100) that includes power management, in accordance with the present invention. The exemplary battery-powered system (100) includes a first charger circuit (110), a second charger circuit (120), a protection circuit (130), a digital circuit (140), an analog circuit (150), a monitor circuit (160), five switching circuits (SC11–SC15), a rechargeable battery (CELL), and a load circuit (LOAD). The power management system may be implemented, in whole or in part, as an integrated circuit. Moreover, the battery-powered system may be integrated, in whole or in part, into a single system that includes the power management system. The rechargeable battery may be any type of rechargeable battery such as nickel-cadmium, nickel-metal-hydride, lithium-ion, and lithium-polymer.

Monitor circuit 160 is arranged to sense the voltage (VCELL) of the rechargeable battery and provide control signals (POR1–POR5) based on the sensed voltage. Charger circuit 110 is arranged to couple power from an input power source to rechargeable battery CELL when switching circuit SC12 is in a first position. Charger circuit 120 is arranged to couple power from an input power source (VIN) to the rechargeable battery CELL when switching circuit SC12 is in a second position. Switching circuit SC12 is selectively switched between the first and second positions in response to control signal POR2. Protection circuit 130 is coupled to input power source (VIN), and selectively coupled to rechargeable battery CELL through switching circuit SC11, when switching circuit SC11 is actuated by control signal POR1. The load circuit (LOAD) is selectively coupled to rechargeable battery CELL though switching circuit SC13, when switching circuit SC13 is actuated by control signal POR3. Analog circuit 140 is selectively coupled to rechargeable battery CELL through switching circuit SC14, when switching circuit SC14 is actuated by control signal POR4. Digital circuit 150 is selectively coupled to rechargeable battery CELL through switching circuit SC15, when switching circuit SC15 is actuated by control signal POR5.

The sense voltage (VCELL) corresponds to the charge level of the rechargeable battery (CELL). The monitor circuit determines an operating range for the sense voltage, where each operating range corresponds to a range of voltages. Thus, the charge level of the rechargeable battery (CELL) corresponds to one of the operating ranges. The boundaries for the voltage ranges are determined by the battery type and any necessary requirements for the system (i.e., system 100). Each operating range corresponds to a different operating state for the system.

The monitor circuit is arranged to continuously monitor the sense voltage (VCELL). The monitor circuit (160) provides the control signals (POR1–POR5) in response to the sense voltage (VCELL). The monitor circuit (160) quantifies the sense voltage to determine a current operating range for the rechargeable battery (CELL). Any number of ranges, and corresponding operating states may be employed as is necessary for a particular system implementation.

In one embodiment, the monitor circuit includes one or more comparator circuits that are arranged to compare the sense voltage (VCELL) to one or more corresponding reference voltages. The corresponding reference voltages are different from one another such that multiple operating states are determined for the system. For example, each circuit that is loading down the rechargeable battery (i.e., ANALOG CIRCUIT 140, LOAD, and DIGITAL CIRCUIT 150) may be disabled when the rechargeable battery is below a first voltage level. By selectively disabling circuitry, power is conserved while the rechargeable battery has a low charge, and battery charging is facilitated with minimum loading.

Analog circuit 150 may be any analog circuit that is necessary in the system. Example circuits include current limiters, thermal sensors, voltage controllers as well as other analog circuitry. In one particular example, a band-gap reference circuit may be included in analog circuit 150. The band-gap reference circuit may not provide a stable output voltage until the power supply for the band-gap reaches a minimum voltage level. The voltage monitor circuit asserts control signal POR4 such that the analog circuit is decoupled from power (i.e., the rechargeable battery). By decoupling the analog circuit from power, the power supply (VS) for the band-gap reference circuit is disabled until the minimum voltage level for control signal POR4 is achieved.

Digital circuit 150 includes any electronics that provide digital electronic functions. Example digital electronics include circuit components that are required to retain a state, such as, memory elements, state machines for charging/discharging algorithm execution, timers, data converters, and digital status drivers, as well as others. Similar to the analog circuits described above, the digital electronics may have a minimum safe operating range. By decoupling the digital circuit from power, the power supply (VS) for the digital circuit is disabled until the minimum voltage level for control signal POR5 is achieved.

Although FIG. 1 illustrates two charger circuits, a single charger circuit, or a multiplicity of charger circuits may be employed as may be desired. One of the charger circuits (110 and 120) provides a charge path from the input power (VIN) to the rechargeable battery based on the sense voltage (VCELL). In one example, charger circuit 110 is arranged to operate when the sense voltage is below a minimum level (i.e a low voltage charger), and charger circuit 120 is arranged to operate when the sense voltage is above the minimum level (i.e., a high voltage charger). A charge path is selected based on the position of switching circuit SC12, which is responsive to control signal POR2.

Multiple charger circuits may be necessary in a system where a particular charger circuit may be unable to operate below a minimum. For example, a shunt regulator may have a minimum operating voltage of 2V for proper regulation. In this instance, the shunt regulator is coupled to the rechargeable battery when the sense voltage is above 2V, and a "trickle charge" circuit is coupled to the rechargeable battery when the sense voltage is below 2V. The trickle charge circuit may be a simple passive network, a diode circuit, or some other circuit that is arranged to provide a small charge to the rechargeable battery.

Protection circuit 130 is a circuit that is arranged to limit the input power (VIN) from damaging the electronic system (100), when activated. The protection circuit may be included in a shunt regulator circuit. In one example the protection circuit is arranged to operate as a crowbar circuit when activated. The protection circuit (130) is activated when switching circuit SC11 is actuated in response to control signal POR1. By decoupling the protection circuit from the rechargeable battery, the power supply (VS) for the protection circuit is disabled until the minimum voltage level for control signal POR1 (i.e., the minimum voltage level of the rechargeable battery is achieved such that POR1 is asserted) is achieved.

A non-compliant power source corresponds to a power source that has a voltage and/or current characteristic that exceeds the design criteria for a rechargeable battery system. The use of a non-compliant charger in a charger system may result in an overcharged cell, or damage to the rechargeable battery system. Protection circuit 130 may also be arranged to protect electronic system 130 from damaging electronic system 100.

The switching circuits (SC11–SC15) each include a closed position and an open position. Each switching circuit is actuated in response to a respective controls signal (i.e., POR1–POR5). In one example, one or more of the switching circuits are arranged to operate as voltage controlled switches that are in an open position when the control signal is above a switching voltage level, and in a closed position when the control signal is below the switching voltage level. In another example, one or more of the switching circuits are arranged to operate as voltage controlled switches that are in an open position when the control signal is above a first switching voltage level, and in a closed position when the control signal is below a second switching voltage level such that the switching circuit operates as a switch with hysteresis. The hysteresis may be employed to account for a power supply voltage (the sense voltage, VCELL) drop that is incurred while the rechargeable battery unit is loaded down by the various circuits. For example, the sense voltage (VCELL) is higher for an unloaded rechargeable battery than a loaded rechargeable battery.

The load circuit is a battery power consuming circuit. Example load circuits include a computer device, a cordless telephone, a pager, a cellular telephone, a handheld transceiver (i.e., walkie-talkie), a portable global positioning system (GPS) receiver, a power tool, and other devices that utilize a rechargeable battery. The load circuit is coupled to the rechargeable battery when switching circuit SC13 is actuated by control signal POR3. By decoupling the load circuit from the rechargeable battery, the load circuit is effectively disabled and power is conserved.

The system employed by the present invention is arranged to sense the voltage of the rechargeable battery and selectively enable various circuits (i.e., circuits 110–150 and LOAD) using a monitor circuit (160) and associated switching circuits (i.e., SC11–SC15). One or more general-purpose devices such as an analog-to-digital converter that is interfaced with digital logic, a microcontroller, and/or a processor may be arranged to perform the monitor circuit function. For example, an analog-to-digital converter may be employed to convert the rechargeable battery voltage to a digital representation, where a processor compares the digital representations to predetermined values. The predetermined values may be found, for example, in a look-up table, or a register or memory of the processor. The switching circuits (SC11–SC15) may be replaced with another enable logic. The processor may also be responsive to a stored program that provides the functions of the monitor circuit and effectuates the activation of the various circuits as is desired.

Figure 2:
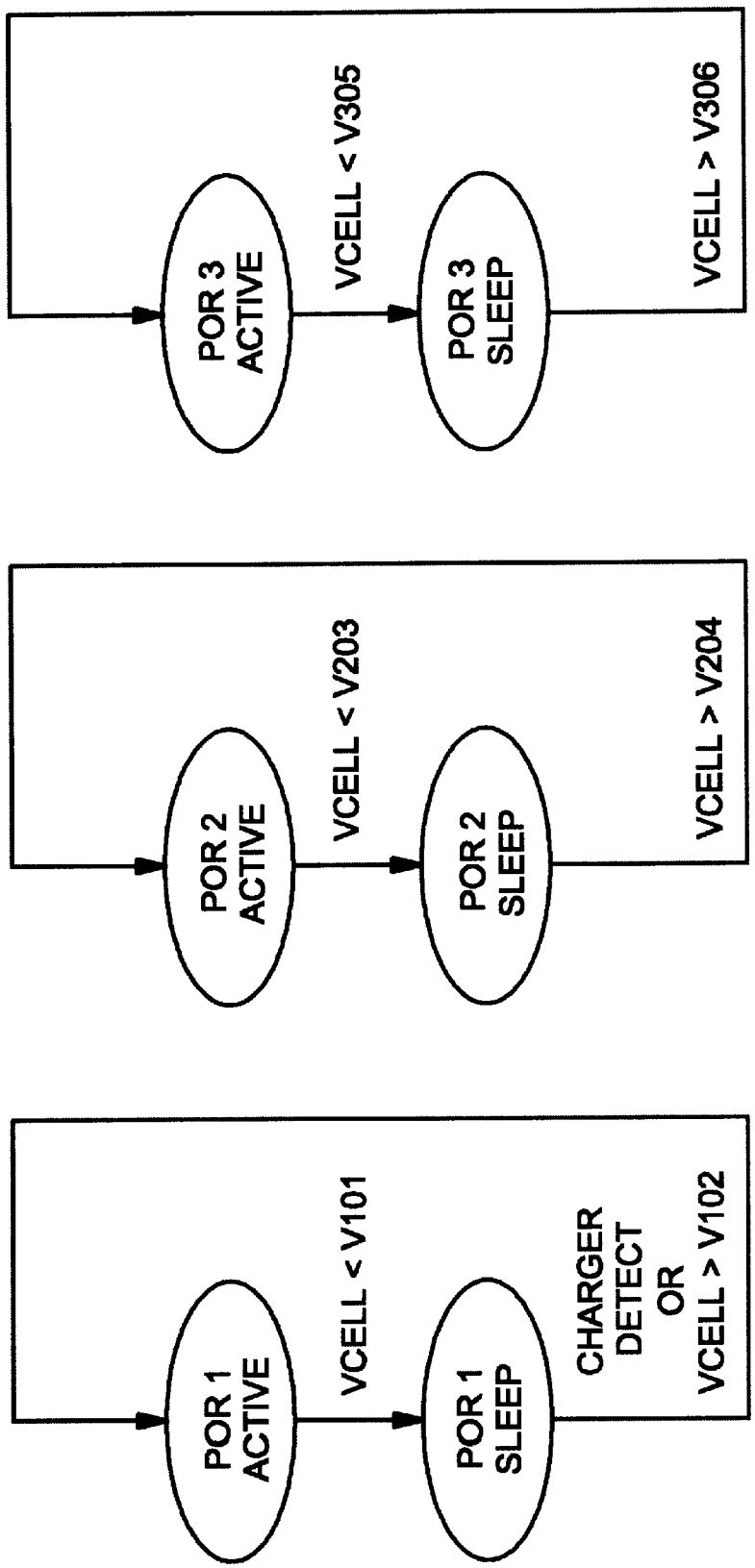
FIG. 2 is a state diagram for an exemplary control circuit.
Figure 3:
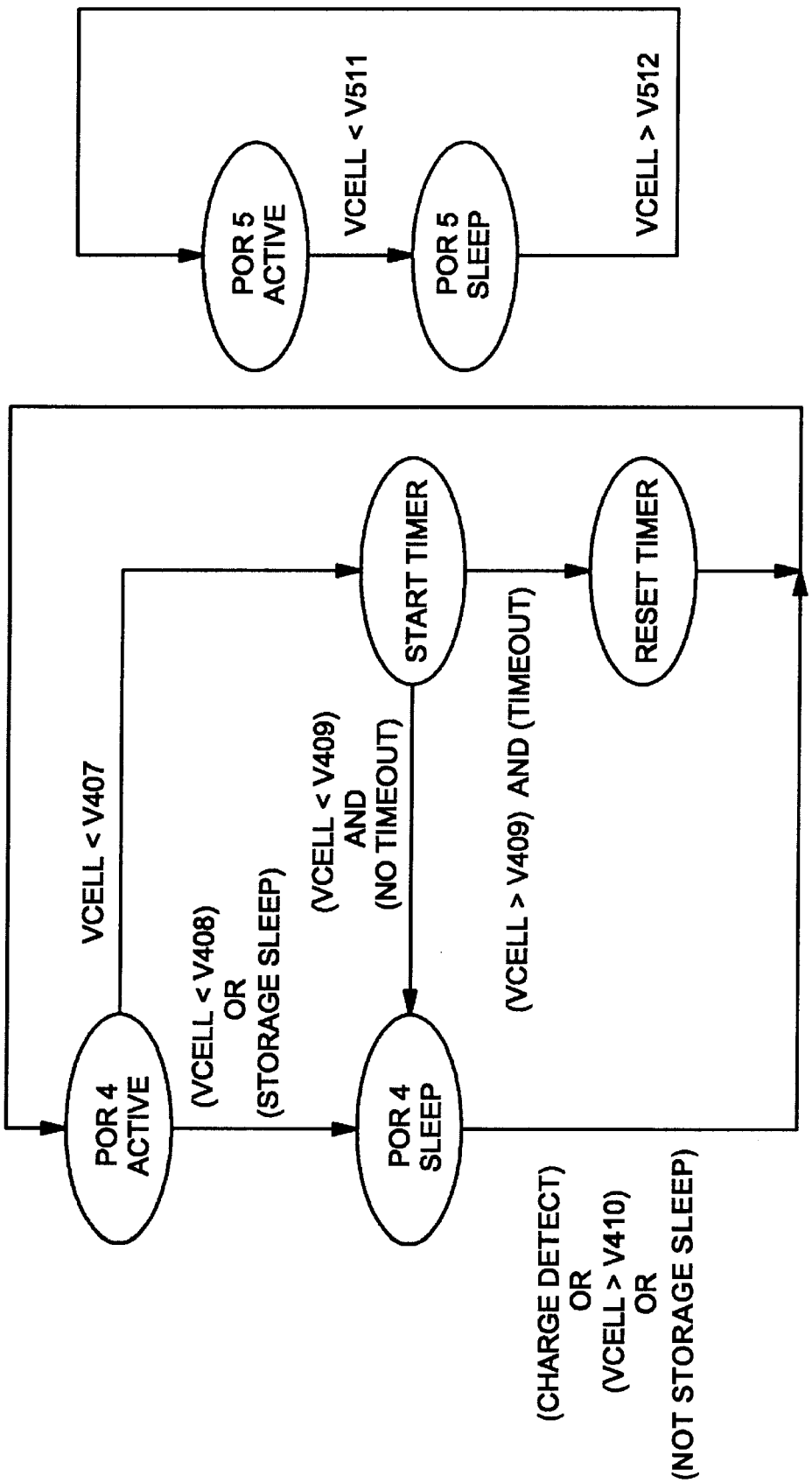
FIG. 3 is another state diagram for an exemplary control circuit.

The system employed by the present invention may be arranged to have a different sequence for discharging and charging of the battery cell. For example, the POR control signals are activated and deactivated based on different criteria when the rechargeable battery is discharging them when the rechargeable battery is charging. The POR signals have two operating modes: a sleep mode, and a wake mode. The sleep mode refers to the situation where various POR control signals become disabled during discharge, while the wake mode refers to the situation where various POR control signals become active while the rechargeable battery is charging. FIGS. 2 and 3 illustrate exemplary state diagrams of control signals POR1–POR5 for the control system of FIG. 1.

Control signal POR1 transitions from active to sleep mode when the sense voltage (VCELL) is less than a first predetermined voltage level (V101). POR1 transitions from sleep mode to active mode when the charger is detected OR when the sense voltage (VCELL) exceeds a second predetermined level (V102). In one example, V102>V101 such that the activation of switching circuit SC11 has hysteresis. In another example, V101=V102.

Control signal POR2 transitions from active to sleep mode when the sense voltage (VCELL) is less than a third predetermined voltage level (V203). POR2 transitions from sleep mode to active mode when the sense voltage (VCELL) exceeds fourth predetermined level (V204). In one example, V204>V203 such that the activation of switching circuit SC12 has hysteresis. In another example, V204=V203.

Control signal POR3 transitions from active to sleep mode when the sense voltage (VCELL) is less than a fifth voltage level (V305). POR3 transitions from sleep mode to active mode when the sense voltage (VCELL) exceeds a sixth predetermined level (V306). In one example, V306>V305 such that the activation of switching circuit SC13 has hysteresis. In another example, V306=V305.

Control signal POR4 transitions from active to sleep mode when the sense voltage (VCELL) is less than an eighth predetermined voltage level (V408), or when a storage mode (STORAGE SLEEP) is activated. POR4 transitions from sleep mode to active mode when the charger is detected or the sense voltage (VCELL) exceeds a tenth predetermined voltage level (V410). A timer is started (START TIMER) when the sense voltage (VCELL) is less than a seventh predetermined voltage level (V407). The timer is reset (RESET TIMER) when the sense voltage (VCELL) exceeds a ninth predetermined voltage (V409) and the timer reaches a timeout condition (TIMEOUT). Control signal POR4 returns to an active mode when the timer is reset. Control signal POR4 transitions into the sleep mode when the sense voltage is below the ninth predetermined voltage (V409) and the timer fails to reach the timeout condition (NO TIMEOUT). In one example, V410>V409>V407>V408, such that the activation of switching circuit SC14 has hysteresis. In another example, V407=V409, and V108=V110.

The storage mode may be activated by a digital control signal (not shown). The storage mode is useful for reducing power consumption when a particular system is implemented in a portable device that may be stored for a prolonged period of time without use. For example, a cellular telephone may be stored in a warehouse before sale for an extended period of time. In this instance, the cellular telephone is placed in a storage mode until activated by a user (i.e., after a sale).

Control signal POR5 transitions from active to sleep mode when the sense voltage (VCELL) is less than a eleventh predetermined voltage level (V511). POR5 transitions from sleep mode to active mode when the sense voltage (VCELL) exceeds a twelfth predetermined level (V512). In one example, V512>V511 such that the activation of switching circuit SC15 has hysteresis. In another example, V512=V511.

In one embodiment of the invention, a common circuit such as the monitor circuit illustrated in FIG. 1 does not necessarily generate all of the control signals (POR1–POR5). One or more of the circuits may be self-sensing such that a switching circuit and a monitor is unnecessary. For example, the protection circuit may include a resistor in series with the rechargeable battery such that one or more portions of the protection circuit are deactivated. The resistor may be arranged to provide a turn off path for one or more transistors in the protection circuit. In this instance, the protection circuit is disabled until the rechargeable battery reaches a sufficiently high voltage to activate the transistors in the protection circuit. Thus, it is within the scope of the present invention that each of the circuits (110–160) may be self-enabled by sensing the power supply (VCELL) directly.

Figure 4:
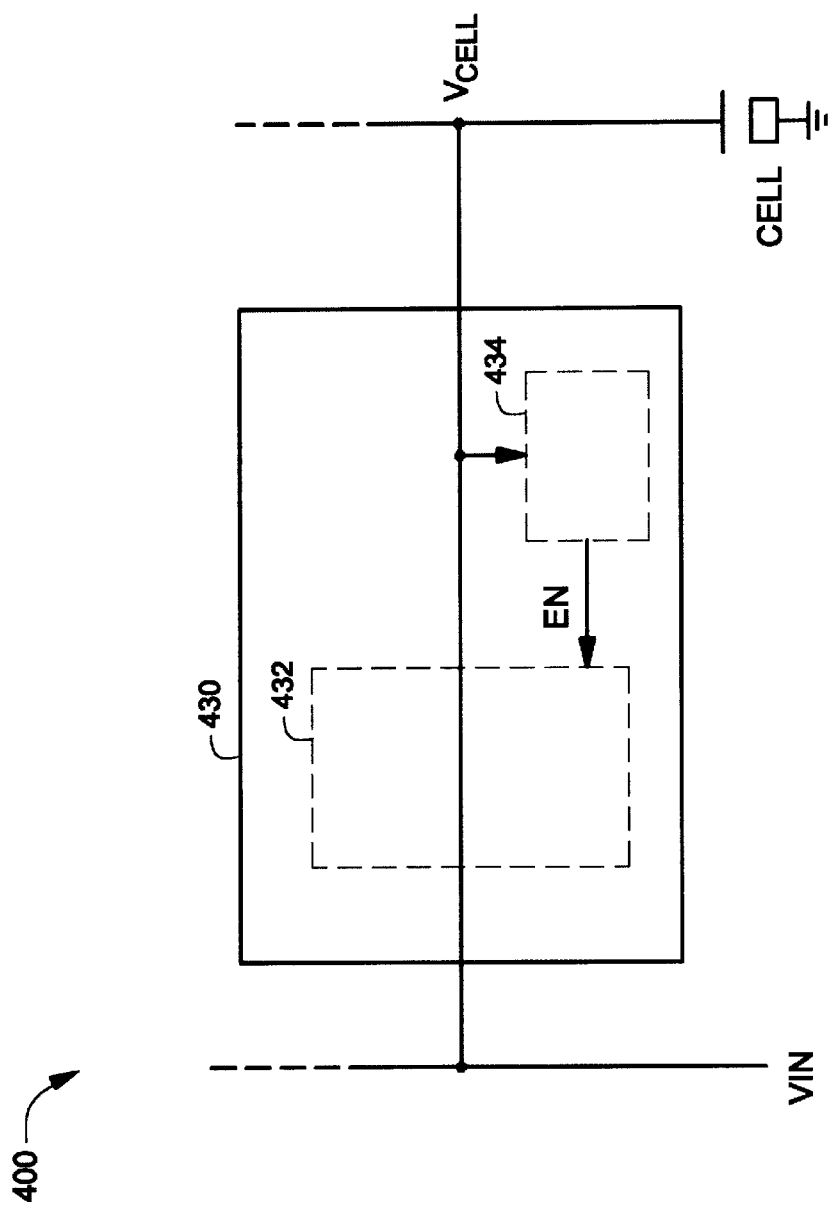
FIG. 4 is a schematic diagram of a portion of an exemplary control circuit, in accordance with the present invention.

FIG. 4 is a schematic diagram of another exemplary system (400) that includes sleep mode power management in accordance with the present invention. The exemplary system (400) includes a protection circuit (430), and a rechargeable battery (CELL). The sleep mode power management system may be implemented, in part or whole, as an integrated circuit. The rechargeable battery may be any type of rechargeable battery such as nickel-cadmium, nickel-metal-hydride, lithium-ion, and lithium-polymer.

Protection circuit 430 includes at least a first portion (432) and a second portion (434). The first and second portions are in communication with one another. For example, the first portion of the protection circuit may be activated by an enable signal (EN) that is provided from the second portion of the protection circuit. In this example, the second portion of the protection circuit is arranged to sense the voltage (VCELL) associated with the rechargeable battery (CELL), provide an enable signal when the sense voltage exceeds a predetermined level. As previously discussed with reference to FIG. 1, protection circuit 130 may be configured to operate without the necessity of a switching circuit (SC11) and a monitor circuit (160). As shown in FIG. 4, protection circuit 430 is coupled to the rechargeable battery without the need of a monitor circuit (i.e., monitor circuit 160) and also without the need of a switching circuit (i.e. switching circuit SC11). Instead, the second portion of the protection circuit is configured to operate as a voltage sense circuit that is employed to enable the first portion of the protection circuit.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A power management system in an electronic system that is powered by a rechargeable battery, comprising:

a protection circuit that is coupled to an input power source, wherein the protection circuit is arranged to protect the electronic system from a non-compliant power source when activated;

a load circuit;

a load switching circuit that is arranged to couple the load circuit to the rechargeable battery when activated, and arranged to decouple the load circuit from the rechargeable battery when deactivated, such that battery power is conserved when the load switching circuit is deactivated; and a monitor circuit that is arranged to monitor a sense voltage, wherein the sense voltage is associated with the rechargeable battery, and wherein the monitor circuit is configured to deactivate the protection circuit when a first predetermined voltage level exceeds the sense voltage, activate the protection circuit when the sense voltage exceeds a second predetermined voltage level, deactivate the load switching circuit when a fifth predetermined voltage level exceeds the sense voltage, and activate the load switching circuit when the sense voltage exceeds a sixth predetermined voltage level.

2. A power management system as in claim 1, wherein the first predetermined voltage level and the second predetermined voltage level are the same.

3. A power management system as in claim 1, wherein the fifth predetermined voltage level and the sixth predetermined voltage level are the same.

4. A power management system as in claim 1, wherein the second predetermined voltage level is greater than the first predetermined voltage level.

5. A power management system as in claim 1, wherein the sixth predetermined voltage level is greater than the fifth predetermined voltage level.

6. A power management system as in claim 1, wherein the sixth predetermined voltage level is greater than the second predetermined voltage level, such that the protection circuit is activated and the load switching circuit is deactivated when the sense voltage is between the second predetermined voltage level and the sixth predetermined voltage level.

7. A power management system as in claim 1, wherein the monitor circuit is configured to detect the input power source, and the protection circuit is activated when the input power source is detected.

8. A power management system as in claim 7, further comprising an analog circuit that is coupled to the rechargeable battery when active, wherein the analog circuit is active when at least one of the input power source is detected, and the sense voltage exceeds a tenth predetermined voltage level.

9. A power management system as in claim 8, wherein the monitor circuit is configured to detect when a storage sleep mode is active, and the analog circuit is activated when the storage sleep mode is inactive.

10. A power management system as in claim 8, wherein the analog circuit is deactivated when at least one of a storage sleep mode is active, and the sense voltage is below an eighth predetermined voltage level.

11. A power management system as in claim 10, wherein the tenth predetermined voltage level is greater than the eighth predetermined voltage level.

12. A power management system as in claim 8, wherein a timer is started when the sense voltage is below a seventh predetermined voltage level, the analog circuit is deactivated when the sense voltage is below a ninth predetermined voltage level and a timeout condition for the timer fails, and the timer is reset when the sense voltage is greater than the ninth predetermined voltage and the timer reaches the timeout condition.

13. A power management system as in claim 12, wherein the tenth predetermined voltage level is greater than the eighth predetermined voltage level, and the ninth predetermined voltage level is greater than the seventh predetermined voltage level.

14. A power management system as in claim 1, further comprising a digital circuit that is coupled to the rechargeable battery when active, wherein the monitor circuit is configured to deactivate the digital circuit when an eleventh predetermined voltage level exceeds the sense voltage, and activate the digital circuit when the sense voltage exceeds a twelfth predetermined voltage level.

15. A power management system as in claim 14, wherein the eleventh predetermined voltage level and the twelfth predetermined voltage level are the same.

16. A power management system as in claim 1, further comprising:

a first charger circuit that is coupled to the input power source and arranged to control charge flow from the input power source to the rechargeable battery when active, wherein the monitor circuit is configured to activate the first charger circuit when a third predetermined voltage level exceeds the sense voltage; and a second charger circuit that is coupled to the input power source and arranged to control charge flow from the input power source to the rechargeable battery when active, wherein the monitor circuit is configured to activate the second charger circuit when the sense voltage exceeds a fourth predetermined voltage level.

17. A power management system as in claim 16, wherein the third predetermined voltage level and the fourth predetermined voltage level are the same.

18. A power management system in an electronic system that is powered by a rechargeable battery, comprising:

a protection circuit that is coupled to an input power source and to the rechargeable battery, wherein the protection circuit is arranged to protect the electronic system from a non-compliant power source when a battery voltage associated with the rechargeable battery is above a first predetermined voltage level, and the protection circuit is inactive when the battery voltage is below a second predetermined voltage level;

a load circuit that is coupled to the rechargeable battery when the battery voltage exceeds a sixth predetermined voltage level, and the load circuit is decoupled from the rechargeable battery when the battery voltage is less than a fifth predetermined voltage level;

a first charger circuit that is coupled to the input power source and arranged to control charge flow from the input power source to the rechargeable battery when active, wherein the first charger circuit is active when the battery voltage is less than a third predetermined voltage level; and a second charger circuit that is coupled to the input power source and arranged to control charge flow from the input power source to the rechargeable battery when active, wherein the second charger circuit is active when the battery voltage is greater than a fourth predetermined voltage level, wherein battery power is conserved by selectively activating and coupling circuits to the rechargeable battery based on the battery voltage.

19. The power management system in claim 16, wherein the load circuit is at least one of a portable computer, a cellular telephone, a pager, a radio, and a power tool.

20. The power management system in claim 16, wherein the rechargeable battery is a type of battery that includes at least one of nickel-cadmium, nickel-metal-hydride, lithium-ion, and lithium-polymer.

21. A power management system in an electronic system that is powered by a rechargeable battery, comprising:

a means for protecting that is coupled to an input power source and to the rechargeable battery, wherein the means for protecting is arranged to protect the electronic system from a non-compliant power source when a battery voltage associated with the rechargeable battery is above a first predetermined voltage level, and the protection circuit is inactive when the battery voltage is below a second predetermined voltage level;

a load circuit that is coupled to the rechargeable battery when the battery voltage exceeds a sixth predetermined voltage level, and the load circuit is decoupled from the rechargeable battery when the battery voltage is less than a fifth predetermined voltage level;

a first means for charging that is coupled to the input power source and arranged to control charge flow from the input power source to the rechargeable battery when active, wherein the first means for charging is active when the battery voltage is less than a third predetermined voltage level; and a second means for charging that is coupled to the input power source and arranged to control charge flow from the input power source to the rechargeable battery when active, wherein the second means for charging is active when the battery voltage is greater than a fourth predetermined voltage level, wherein battery power is conserved by selectively activating and coupling circuits to the rechargeable battery based on the battery voltage.

* * * * *